March 10, 1925.

E. V. MYERS

AUTOMOBILE BRAKE

Original Filed June 16, 1916

1,528,841

Inventor:
Eugene V. Myers,
By Attorneys,

Patented Mar. 10, 1925.

1,528,841

UNITED STATES PATENT OFFICE.

EUGENE V. MYERS, OF EAST ORANGE, NEW JERSEY.

AUTOMOBILE BRAKE.

Original application filed June 16, 1916, Serial No. 103,941. Divided and this application filed February 23, 1921. Serial No. 447,119.

*To all whom it may concern:*

Be it known that I, EUGENE V. MYERS, a citizen of the United States of America, residing in East Orange, in the county of Essex and State of New Jersey, have invented certain new and useful Improvements in Automobile Brakes, of which the following is a specification.

This invention relates to automobile brakes and aims to provide certain improvements therein.

In the common form of automobile brake a drum is used upon the wheel or in some cases in the transmission or engine shaft, and a band is provided which either surrounds the drum or is placed within it. Usually a single drum is provided and one band is used for the foot brake and the other band for the emergency brake. These bands are necessarily subjected to severe usage, with the result that they speedily wear and require frequent adjustment. A very large proportion of the accidents in motor cars is occasioned by the fact that the brake bands are worn to a point where they cannot apply sufficient force to stop the car. This is often times not discernible to the average user since in ordinary use in making stops the driver throws out his clutch and allows the car to "drift" to its stopping place, the brake being used to a slight degree. When an emergency arises, however, and it is necessary to stop the car quickly, the brakes are not capable of responding to the extraordinary demand which is made upon them.

According to the present invention I provide an automobile brake in which these disadvantages are largely if not fully avoided. In the form of the invention disclosed in this application, which is a division of my prior application Serial No. 103,941, filed June 16, 1916, which has become Patent No. 1,372,769, dated March 29, 1921, I provide means whereby there is a progressive and automatic taking up of the brake band so that as the latter wears, the mechanism at some point compensates for the wear. The invention also includes a novel type of brake and brake band and also certain other improvements which will be hereinafter more fully described.

In referring to the drawings which illustrate the preferred form of the invention,—

Figure 3:
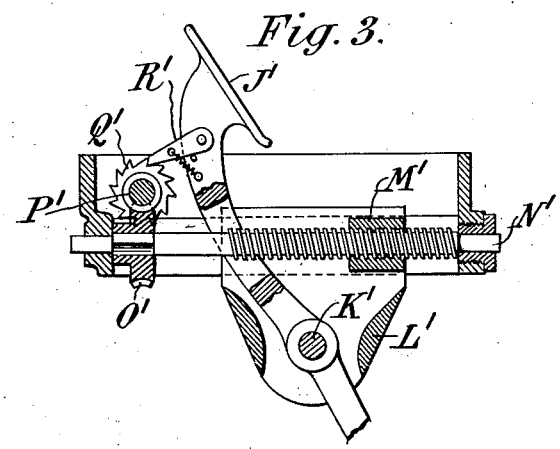
Fig. 3 illustrates one feature of the invention as applied to a foot lever.

In Fig. 3 I have shown the invention as applied to a foot lever J' which is pivoted at K' to a sliding frame L'. The frame L' has a block M' which is screw threaded on its interior to engage a screw threaded bolt or shaft N'. The forward end of the shaft is square to receive a worm wheel O' operated by a worm P' which, itself, is actuated by a ratchet wheel Q', moved by a pawl R' pivoted to the foot lever J'. As the brake system becomes worn, the movement of the foot lever J' becomes longer and the pawl R' strikes the ratchet wheel, thereby rotating the worm P' and through the worm O' rotating the shaft N', thus moving the frame L' in a direction to take up the slack, preferably forwardly.

Figure 1:
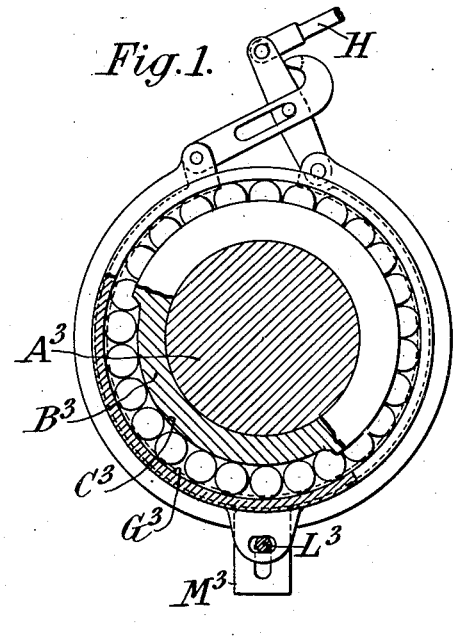
Figure 1 is a cross sectional view of a novel form of brake and brake band.
Figure 2:
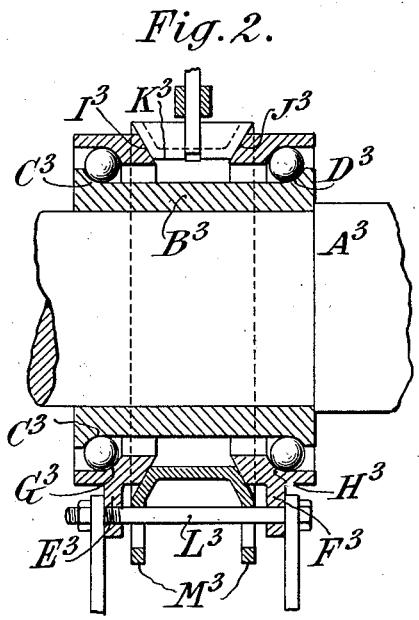
Fig. 2 is an axial section of Fig. 1.

In Figs. 1 and 2 I have illustrated a form of band brake which is adapted for use in connection with my invention. In this construction the axle conventionally illustrated at $A^3$ carries the sleeve $B^3$ having tracks for rolling elements herein disclosed as ball tracks $C^3$ and $D^3$. Two rings such as $E^3$ and $F^3$ are provided encircling the sleeve $B^3$ and these rings are formed with ball opposed tracks $G^3$, $H^3$, respectively. Two series of rolling elements herein disclosed as balls are arranged between the tracks. The rings $E^3$ and $F^3$ are formed with bevel surfaces $I^3$ and $J^3$, respectively, and the brake band $K^3$ is formed with a pair of similar surfaces adapted to engage those on the rings. The rings are fixed to some stationary part, such as the frame, by a bolt $L^3$ and the band $K^3$ is provided with lugs $M^3$ at its bottom engaging the bolt $L^3$ to prevent its rotation, but the lugs being slotted to permit the band to have some play with regard to the bolt. As the band is tightened, the rings are forced apart carrying with them the balls which engage with more or less force the two ball grooves, thus producing friction on the ring $B^3$. This friction is balanced so that there is no end thrust in either direction.

The band of the brake disclosed in Figs. 1 and 2 may be tightened by any appropriate operating means. To this end the brake rod H may be connected through suitable reversing mechanism, not shown, with the foot lever J' of the device disclosed in Fig. 3.

It will be understood that I do not wish to be limited to the specific forms of my invention herein disclosed, since many changes may be made therein.

What I claim is:

1. A brake, comprising two series of balls and two rings engaging said balls, and wedging means acting on said rings for moving the same in opposite directions to compress said series of balls.

2. A brake, comprising two series of balls and two rings engaging said balls, and wedging means acting to spread said rings whereby to compress said series of balls.

3. A brake comprising two series of balls, a bearing member having two ball races, one for each series of balls, a pair of cooperative bearing members each having a single ball race for one of the series of balls, and means for forcing the bearing members of said pair in such directions as to tighten said balls between said ball races.

4. A brake comprising two series of balls, a bearing member having spaced ball races, one for each series of balls, said races being so disposed as to limit movement of said balls toward the ends of said bearing member, a pair of bearing rings each having a second ball race for one of said series of balls, and wedging means for forcibly moving said rings in opposite directions to tighten said balls between said ball races.

5. A brake comprising two series of balls, an inner bearing member having end ball races, one for each series of balls, a pair of surrounding bearing rings each having a second ball race for one of said series of balls, and wedging means for spreading the bearing rings of said pair and thereby tightening said balls between said ball races.

6. A brake comprising relatively rotative members, annular race-ways in said members, rolling elements in annular relation in said race-ways, and means whereby the relative positions of the parts of said members forming said race-ways may be forcibly varied and thereby caused to effect a braking pressure between said members and said rolling elements.

In witness whereof, I have hereunto signed my name.

EUGENE V. MYERS.